(12) United States Patent
Condon et al.

(10) Patent No.: US 9,206,971 B2
(45) Date of Patent: Dec. 8, 2015

(54) METHOD AND APPARATUS FOR CREATING A HIGH EFFICIENCY SURFACE MOUNT ILLUMINATION DEVICE FOR PROJECTING ELECTROMAGNETIC RADIATION AT A HIGH ANGLE FROM THE SURFACE NORMAL

(75) Inventors: Patrick Jeffery Condon, Morris, IL (US); Mark Bryan Pruss, Coal City, IL (US)

(73) Assignee: Dragonfish Technologies LLC, Richland, MI (US)

( * ) Notice: Subject to any disclaimer, the term of this patent is extended or adjusted under 35 U.S.C. 154(b) by 739 days.

(21) Appl. No.: 12/257,742

(22) Filed: Oct. 24, 2008

(65) Prior Publication Data

US 2009/0116243 A1 May 7, 2009

Related U.S. Application Data

(60) Provisional application No. 60/982,955, filed on Oct. 26, 2007.

(51) Int. Cl.

| | |
|---|---|
| *F21V 3/00* | (2015.01) |
| *F21V 5/00* | (2015.01) |
| *F21V 29/00* | (2015.01) |
| *B60Q 1/02* | (2006.01) |
| *B63B 45/02* | (2006.01) |
| *F21S 8/10* | (2006.01) |
| *F21V 5/02* | (2006.01) |
| *F21V 5/04* | (2006.01) |
| *F21V 7/00* | (2006.01) |
| *F21V 29/74* | (2015.01) |
| *F21V 29/83* | (2015.01) |
| *F21W 101/04* | (2006.01) |
| *F21Y 101/02* | (2006.01) |

(52) U.S. Cl.
CPC ............ *F21V 29/004* (2013.01); *B60Q 1/02* (2013.01); *B63B 45/02* (2013.01); *F21S 48/328* (2013.01); *F21V 5/02* (2013.01); *F21V 5/04* (2013.01); *F21V 7/0091* (2013.01); *F21V 29/74* (2015.01); *F21V 29/83* (2015.01); *F21W 2101/04* (2013.01); *F21Y 2101/02* (2013.01)

(58) Field of Classification Search
CPC ......... B60Q 1/02; B63B 45/02; F21S 48/328; F21V 5/02; F21V 5/04; F21V 5/045; F21V 7/0091; F21V 29/004; F21V 29/74; F21W 2101/04
USPC .................... 362/249.02, 294, 540, 543–545
See application file for complete search history.

(56) References Cited

U.S. PATENT DOCUMENTS

| | | | | |
|---|---|---|---|---|
| 4,729,076 | A * | 3/1988 | Masami et al. | 362/235 |
| 5,842,775 | A * | 12/1998 | Roorda et al. | 362/294 |
| 6,206,544 | B1 * | 3/2001 | Costa | 362/242 |
| 7,008,079 | B2 * | 3/2006 | Smith | 362/235 |
| 7,055,995 | B1 * | 6/2006 | Condon et al. | 362/477 |
| 7,588,358 | B1 * | 9/2009 | Condon | 362/522 |

* cited by examiner

*Primary Examiner* — Jason Moon Han
(74) *Attorney, Agent, or Firm* — Boyle Fredrickson, S.C.

(57) ABSTRACT

A marine lamp includes an LED and a heat sink that removes heat from the LED. A lens assembly is associated with the LED and collects the energy from the LED and compresses the light into a high intensity beam. The beam strikes a secondary reflective surface which spreads the light into a desired output distribution. In one particular application, the desired output distribution has a ring-like distribution with a primary light beam at approximately 60 degrees from mounting surface normal.

20 Claims, 8 Drawing Sheets

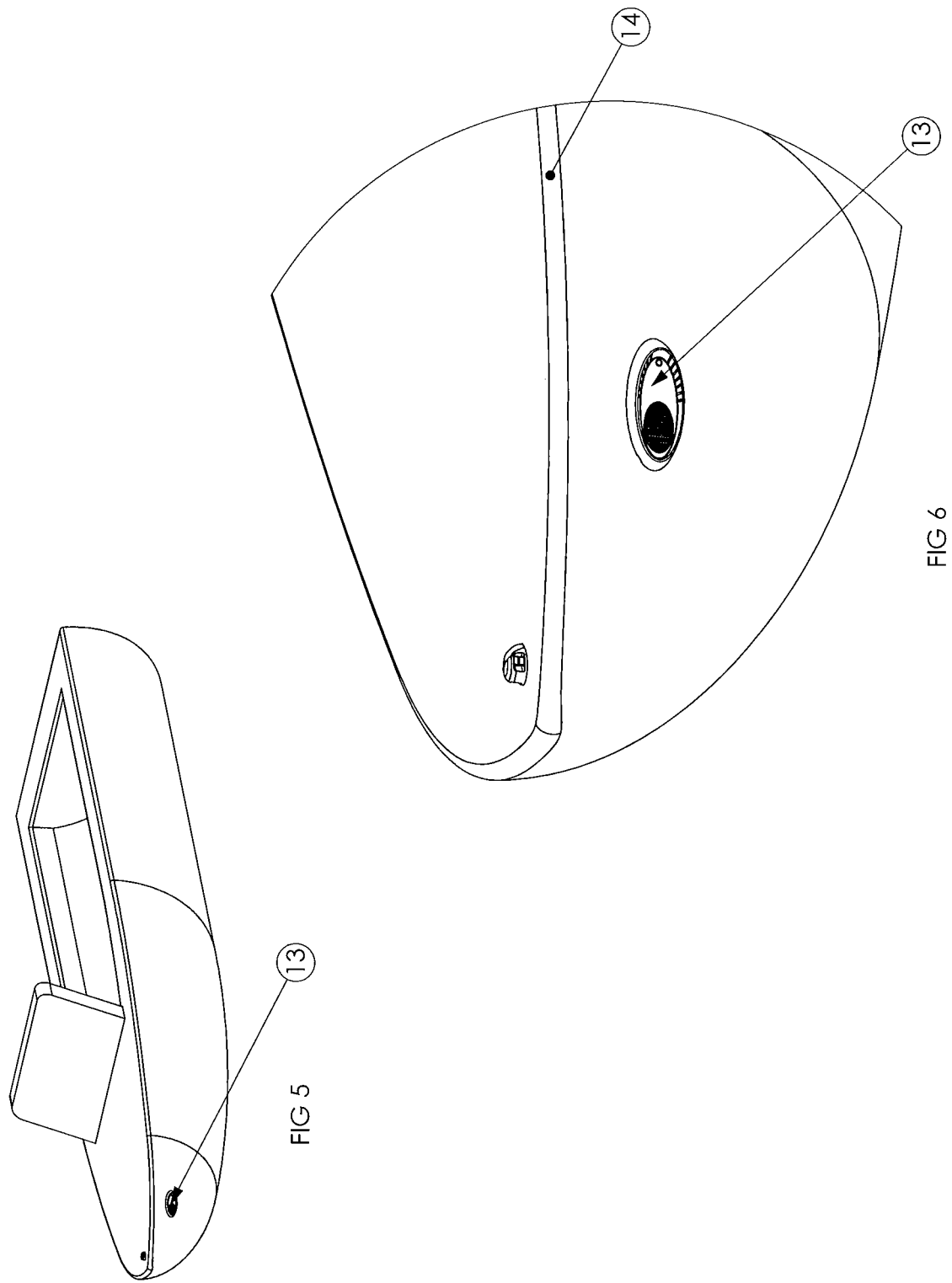

METHOD AND APPARATUS FOR CREATING A HIGH EFFICIENCY SURFACE MOUNT ILLUMINATION DEVICE FOR PROJECTING ELECTROMAGNETIC RADIATION AT A HIGH ANGLE FROM THE SURFACE NORMAL

CROSS-REFERENCE TO RELATED APPLICATION

The present application claims the benefit of U.S. provisional application 60/982,955, filed Oct. 26, 2007.

FIELD OF THE INVENTION

The present invention relates generally to an apparatus for the projection of radiant, particularly electromagnetic energy from a surface mounted lamp at a high angle from the surface normal. More particularly, the invention is directed to the efficient generation and distribution of white light energy from a marine grade lamp for the purpose of docking marine vessels in low light environments.

BACKGROUND OF THE INVENTION

There are many situations where it is desirable to project high intensity beams of light for purposes of illumination. For example, automobile headlamps, flood lighting, vehicle reverse lamps, search lamps and the like. In certain cases it is required that the high intensity beams be projected at a high angle from the emission surface. For example trailer sidewall illumination lamps, marine docking lamps and the like.

In the past these high angle lighting devices have been created using incandescent light sources mounted with parabolic or elliptical reflectors to direct a beam of light in the required direction. This type of construction necessitates a certain amount of thickness to the lamp body. In many applications it is undesirable to have this thickness project from the mounting surface, and it is preferred to have a minimum amount of external projection from the surface. In order to mount this lamp to a surface, large holes must be cut in the mounting surface to allow the projection of the beam from the lamp housing.

For example, in the case of a marine docking lamp, a powerful light source is mounted in a plastic body and is typically angled at 60 degrees to the surface normal. The lamp source is typically 35 to 100 watts and has an integrated parabolic reflector which focuses the light into a powerful high intensity beam which is directed out of the housing through a transparent plastic or glass window.

This type of construction has several disadvantages. The primary drawback of existing docking lamps is that the light source is typically several inches in diameter requiring a large hole to be cut in the boat hull to minimize projection from the surface of the boat. The hole is elliptical in shape and must be accurately cut in relation to the bow to insure the projection angle from the boat hull is within defined guidelines. Boat hulls can be constructed from a variety of materials including fiberglass, steel or aluminum. Cutting an accurately positioned elliptical hole in thick fiberglass or metal can be quite costly. In addition, the hull structure may be weakened by formation of the hole thereby creating a potential water ingress point.

A second major drawback is the heat generated by convention large incandescent light sources. High temperature plastics, metals and glass are generally used for the lamp construction to reduce operator exposure to high surface temperatures. Nevertheless, boat owners have been burned by brushing up against the housings.

Another major drawback of the large powerful sources is the high current draw which requires large gauge wiring, and additional alternator and battery power for a marine vessel to operate. Battery and alternator power are at a premium on marine vessels where the energy is required for critical systems.

In addition to the difficulties in forming the hole in the boat hull, another drawback of conventional docking lights is that once the large hole is cut in the boat hull the point angle of the lamp cannot be easily adjusted. As a result, it is not uncommon for a boat to have docking lights with misaligned beams.

It is also recognized that when docking a marine vessel, a high intensity forward beam is preferred for viewing any hazards ahead of the boat but as the boat enters its slip it is advantageous to have a smaller amount of side light to provide visibility of the dock itself. The preferred light distribution is therefore a high intensity beam directed at approximately 60 degrees from the surface normal surrounded by a rectangle of lower intensity light having a wide beam width. When the lamp is mounted on the surface of the hull, the angle of the hull and the position of the lamp are combined to direct the highest intensity portion of the beam directly ahead.

In contrast to incandescent light sources, Light Emitting Diodes (LEDs) are solid state electrical devices with high efficiencies and long lives. LEDs are generally impact resistant, use very little power and often have 100,000 hour life spans. These features make these devices preferable for use in safety lighting. The primary disadvantage of LED light sources however is their cost. If the efficiency of an optical device to distribute light from the LED into the required or regulated pattern is improved, fewer LEDs can be used resulting in more cost accessible interior illumination and safety lighting devices.

It is recognized that operation and lifespan of an LED device is a partly a function of the temperature of the LED chip. Thus, for LED-based lamps it is generally preferred to maintain the temperature of the diode chip within a controlled temperature range. In addition to reduced LED life, higher LED temperature can affect the output color and intensity of the LED. Thus, to maintain the LEDs at a low operating temperature, LED based lamps are generally designed to have heat sinking and heat radiating features.

Recently, LED manufacturers have turned to surface mountable LED devices that have superior heat removal from the diode junction and higher optical flux per watt. These devices are now being regularly provided with a flat output surface free from the source distorting optics of previous LEDs. These devices typically have very wide output distributions with typical viewing angles greater than 100 degrees. The viewing angle is typically defined as the full angular width of the optical distribution where the light output reaches 50% of the intensity measured on the optical axis. LEDs of this type have generally symmetrical outputs around the center or optical axis. Thus, a device having a viewing angle of 10 degrees describes a conical output distribution where 50% of the peak intensity value occurs at 5 degrees from the optical or center axis of the device. A 120 degree viewing angle device, which is a very common wide output angle LED, defines a device which has an output intensity of 50% at an angle of 60 degrees from the optical axis. These LEDs have output intensity distributions which closely follow a Lambertian plane source emitter and emit light in a 180 degree hemisphere.

Notwithstanding the advantages of such surface mounted LEDs, they are not ideal for use as marine docking light lamps. The wide output of such powerful LED sources requires secondary lensing to collect and direct the light into a useful pattern. In order to efficiently meet light output requirements for a marine docking light application using a hemispherical emitting LED, the energy must be collected, concentrated and directed with the main part of the beam at an angle approximately 60 degrees from the surface normal.

It is generally accepted that when redirecting electromagnetic energy greater than 30 degrees from its emission direction it is advantageous to use reflection to change the light direction. Reflective surfaces can be created using metallization, dielectric coatings or by total internal reflection inside a transparent material. In production, dielectric coatings are often too expensive and are difficult to create on a curved surface. Metallic coating type reflectors typically have light absorption levels of 20% or more thereby reducing system efficiency. This makes it more desirable to use internal reflection whenever possible.

Internal reflection occurs when electromagnetic energy traveling through a transparent material strikes an outer surface at an angle to the surface normal greater than the critical angle for the material. One hundred percent of the light energy is reflected back into the lens material on a path according to the laws of reflection.

In many cases, internal reflection results in thick cross-section lens material and long beam paths inside the material. Thick materials are inherently difficult to mold as most materials shrink when cooling which can create internal stresses and surface deformations. Also, these thick materials often have long beam paths resulting in a need for high clarity materials to minimize beam attenuation.

SUMMARY OF THE INVENTION

The present invention is directed to a surface mount LED based docking lamp that overcomes the aforementioned drawbacks. The lamp includes a heat sink, one or more LED sources, and a high efficiency lens section which employs internal reflection to direct the light energy from a hemispherical emitter into a high intensity beam at a high angle from the mounting surface normal. In one preferred embodiment, the docking lamp has a decorative stainless steel cover.

Prior marine docking lamps are used in a variety of applications including illumination of areas behind cargo trailers to provide greater visibility during low light or low-visibility conditions, e.g., nighttime. In the case of a marine vessel conventional docking lamps are mounted on the hull and angled to the front of the boat to illuminate the area ahead of the boat during low visibility conditions. Due to the high intensity requirements of the lamps, conventional marine lamps have incorporated large sources in the lamp housing which has heretofore required that the lamp body project significantly below the mounting surface. The present invention is directed to a lamp in which the projection of the lamp body below the surface is eliminated and, as such, alleviates the severe mounting requirements of conventional marine lamps.

Conventional marine lamps typically include 35 or 50 watt halogen sources. As a result, conventional marine lamps produce a great amount of heat. Accordingly, in one aspect of the invention, LED sources are used as the light source for a marine lamp. In addition to reduce heat output, some known LED sources are four to eight times more efficient than conventional halogen sources and yet are significantly smaller in size.

While reduced relative to conventional halogen sources, LEDs can emit heat. As such, the present inventors considered a variety of methods and devices to account for the heat output of an LED. The inventors found that a number of heat sink materials could be used, but considering the high power level of the docking lights and with a preferred maximum thickness of approximately one inch, in a preferred embodiment, the marine lamp includes a heat sink formed from aluminum material. The marine lamp may include other heat reduction strategies, such as incorporating air vents in the decorative cover.

In consideration of consumer demand for customization, the present inventors further recognized that by making the light emitting portion as thin as possible it became a simple effort to enclose it in a customized cover. The cover can be a wide variety of materials including but not limited to; aluminum, stainless steel and plastic.

It is therefore an object of the present invention to provide a surface mounted docking light for the projection of light at a high angle from the surface normal.

It is another object of the present invention to provide a low profile surface mounted lamp for the efficient optical projection of a primary beam at an angle of approximately 60 degrees from the surface normal.

It is a further object of the present invention to provide a lower cost and more effective approach to the installation of marine docking lights.

It is a further object of the present invention to provide a surface mount docking lamp with a certain amount of adjustability in the mounting direction for beam alignment.

It is yet a further object of the present invention to provide vehicle lights such as marine vessel docking lighting that are both efficient and cost effective.

It is a further object of the present invention to provide a docking lamp with a total housing thickness of less than 2.5 inches.

It is a further object of the present invention to provide an LED based docking lamp with output comparable to high power halogen docking lamps with approximately one fourth the energy consumption.

Therefore, according to one embodiment of the present invention, an LED-based marine docking lamp is provided. The marine lamp includes a die cast aluminum heat sink, which may be fabricated using conventional fabrication techniques, with a flat or slightly curved back surface may be used as the mounting surface for the lamp. The heat sink removes heat from the LED and conducts the heat to the surrounding environment. A printed circuit board (PCB) assembly comprised of LED(s), drive electronics and a supporting substrate may be attached to the heat sink to provide the required thermal contact for the LED(s) to remain cool. A lens assembly is affixed above the LED(s) to efficiently collect the energy from the hemispherical emitter and compress the light into a high intensity beam. The beam strikes a secondary reflective surface which spreads the light into the required output distribution. A decorative stainless steel cover may be placed over the assembly and provides an aperture for the lens to project the light through. The docking lamp may have a thickness of less than 1 inch with a primary emission angle of 60 degrees to the mounting surface.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings:

FIG. 5 is an isometric view of a marine vessel outfitted with a marine docking lamp in accordance with the present invention;

FIG. 6 is a close up view of the bow section of the small marine vessel outfitted with a marine docking lamp shown in FIG. 5;

DETAILED DESCRIPTION

As will be described herein, the present invention is directed to a surface mounted marine docking light or lamp and method of manufacturing same. However, it is appreciated that the present invention may be applicable with lights or lamps used for other applications, such as specialty lighting, home lighting, over-land vehicles, watercraft, aircraft and manned spacecraft electric cars, airplanes, helicopters, space stations, shuttlecraft, and the like.

Figure 1:
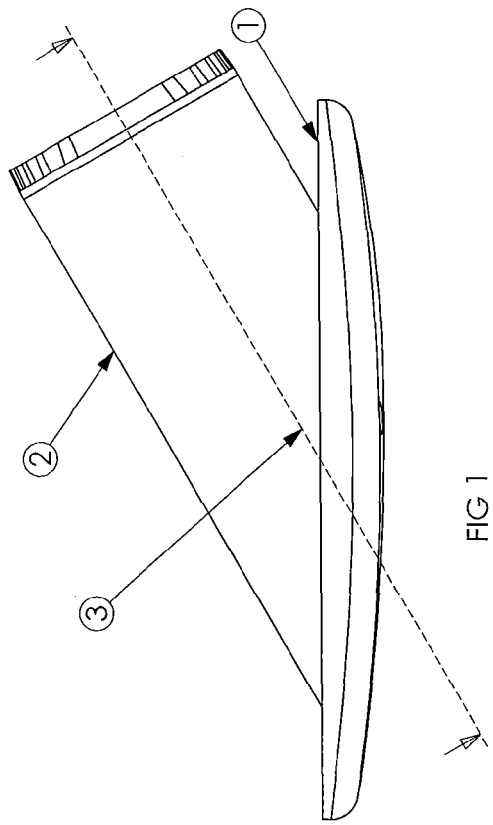
FIG. 1 is a side elevation view of a prior art marine docking lamp.

Referring now to FIG. 1, a conventional lamp often used for marine applications is shown. Conventional lamps include a flange with a flat rear back 1 which is mounted directly to the boat hull. The light source of the lamp may be incandescent, halogen, LED, gas discharge lamp or the like and is mounted within circular housing section 2 which projects backward from the mounting surface 1 at an angle of approximately 60 degrees from the normal.

Figure 2:
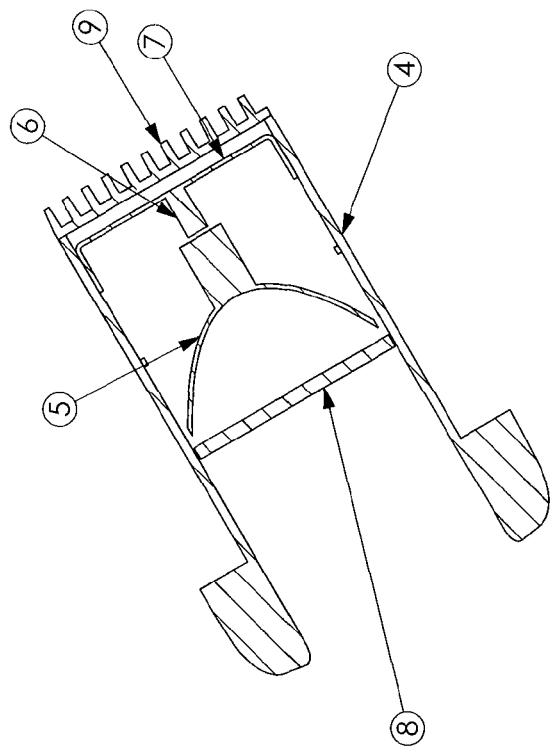
FIG. 2 is a section view of the lamp shown in FIG. 1.

As further shown in FIG. 2, light source 5 has a parabolic reflecting optic to direct light out through transparent window 8 and out from the boat. The light assembly is housed in tube 4 and in this view is plugged into connector 6 which is retained by mounting bracket 7. A metal heat sink 9 is attached to the rear of the lamp to provide additional thermal relief.

Figure 3:
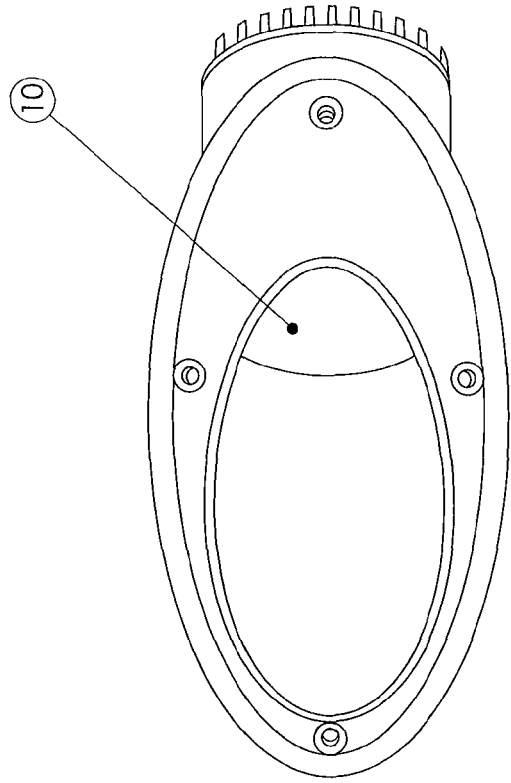
FIG. 3 is a top view of the marine lamp shown in FIG. 1.

As shown in FIG. 3, the lamp includes a glass lens 10 where the light emits toward the intended direction.

Figure 4:
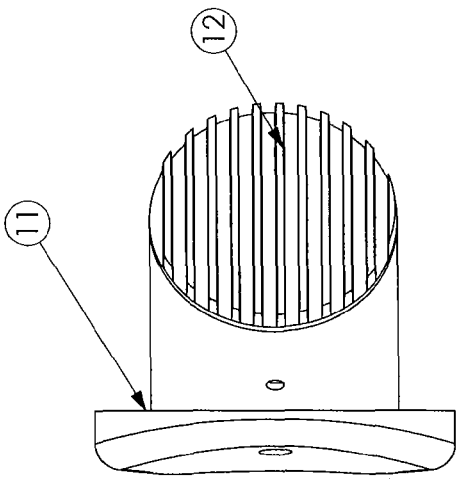
FIG. 4 is an end view of the marine lamp shown in FIG. 2.

FIG. 4 is a back view of the conventional marine lamp with the heat sink 12 and the mounting face 11 visible. In order to mount a lamp of this type to a boat hull, a large elliptical hole must be cut through the thick fiberglass or metal. While this can be accomplished by the manufacturer, it is both expensive and time consuming. An additional disadvantage is that the lamp cannot be adjusted easily once mounting is complete.

FIG. 5 is an isometric view of a marine vessel having a docking lamp 13 according to the present invention mounted thereto. As best seen in FIG. 6 the docking lamp 13 can be mounted under the bump rail of the vessel 14 and angled to project the main portion of the beam directly ahead of the boat.

Figure 8:
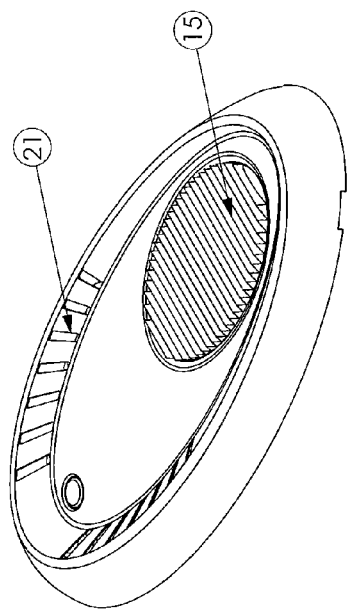
FIG. 8 is a perspective view of the LED marine docking lamp shown in FIG. 7.

Referring now to FIG. 7 through FIG. 11, construction of the marine lamp shown in FIG. 5 is shown. More particularly, FIG. 8 is a perspective view of the surface mountable docking lamp. As shown, the optic outer surface 15 directs the primary beam light out at an angle of 60 degrees from the mounting surface normal and spreads dimmer light through a wide arc. Openings in the outer cover 22 provide air flow over the internal heat sink to maintain the LED sources at their optimal temperature.

Figure 10:
FIG. 10 is a rear elevation view of the LED marine docking lamp shown in FIGS. 7-9.
Figure 7:
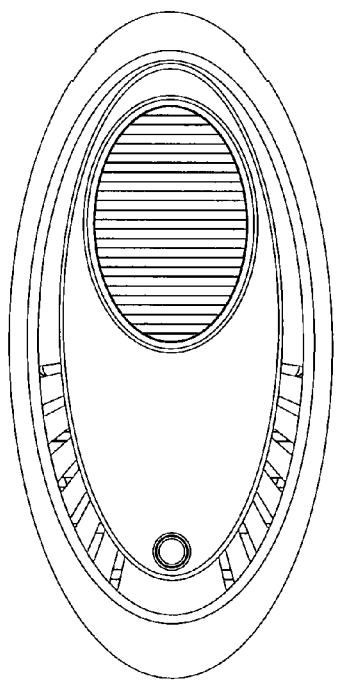
FIG. 7 is a top view of the LED marine docking lamp shown in FIG. 6.
Figure 9:
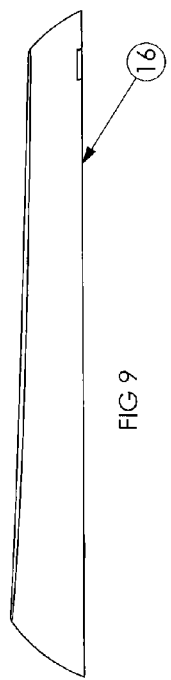
FIG. 9 is a side elevation view of the LED marine docking lamp shown in FIGS. 7-8.

In FIGS. 9-10, the mounting surface 16 is shown to be flat with no projections beyond the surface which would require the cutting of large holes in the boat hull.

Figure 11:
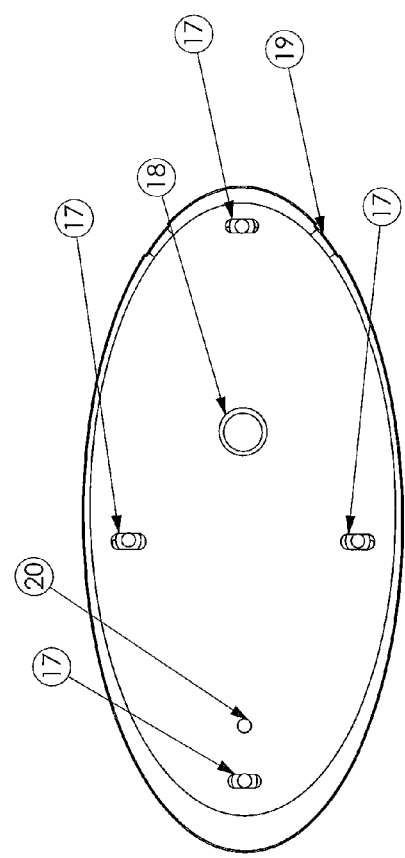
FIG. 11 is a bottom view of the LED marine docking lamp shown in FIGS. 7-10.
Figure 13:
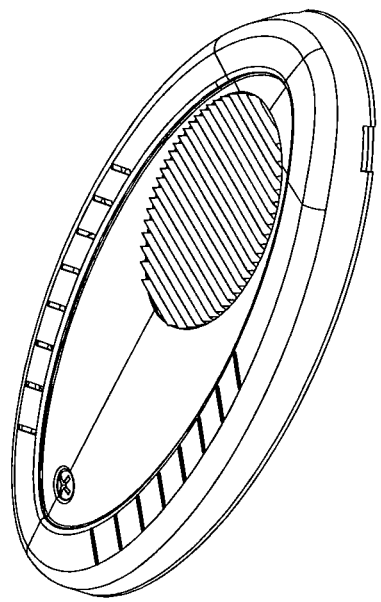
FIG. 13 is a perspective view of the LED marine docking lamp shown in FIG. 12.
Figure 15:
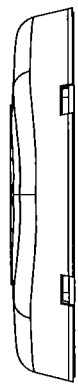
FIG. 15 is a rear elevation view of the LED marine docking lamp shown in FIGS. 12-14.

FIG. 11 is a bottom view of the surface mountable LED based marine docking lamp and shows that the lamp incorporates four mounting slots 17 which allow some adjustment of the light after mounting. Also, the lamp includes a wire egress hole 18 through which power is connected to the lamp through a small hole in the boat hull. This small hole is considerably easier to form than the much larger hole required of conventional marine docking lamps. Retaining features 19 and 20 are used to attach the outer cover once the lamp is mounted to the boat.

Figure 12:
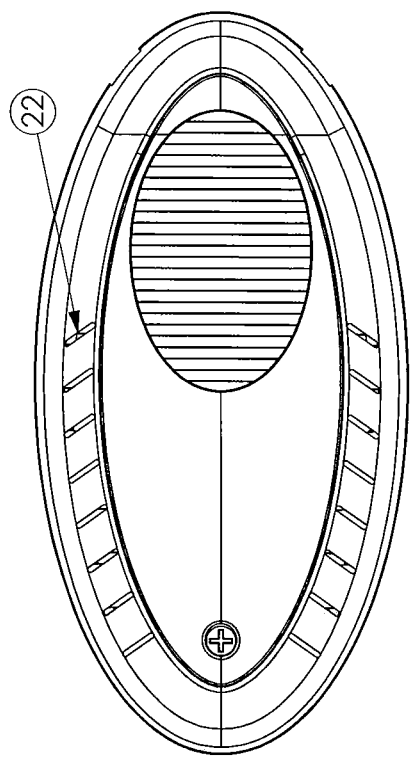
FIG. 12 is a top view of another LED marine docking lamp in accordance with an alternate embodiment the present invention.
Figure 14:
FIG. 14 is an elevation view of the LED marine shown in FIGS. 12-13.

Referring to FIGS. 12-15, a surface mountable LED based docking lamp according to an alternate embodiment of the present invention is shown. This lamp contains the same optics, heat sink, LEDs and other internal components as the lamp described with respect to FIG. 7 through FIG. 11, however a different external cover has been added to provide a unique look with minimal retooling of the internal components. For example, FIG. 12 shows heat sink air vents 22 along the edges of the light to cool the LED sources.

Figure 17:
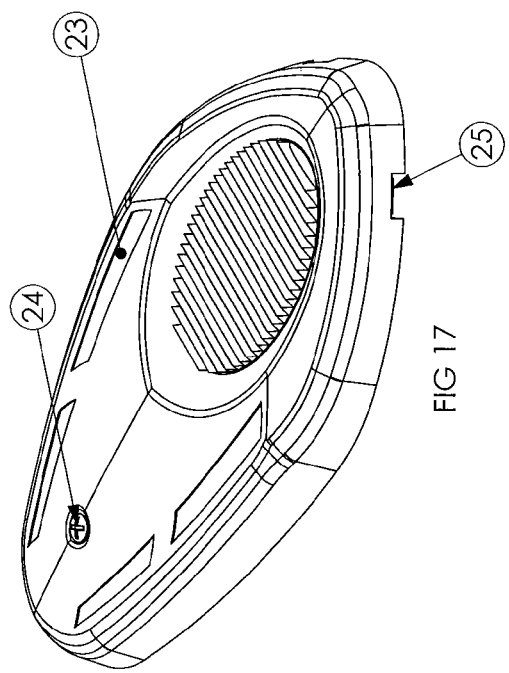
FIG. 17 is a perspective view of the LED marine docking lamp shown in FIG. 16.
Figure 19:
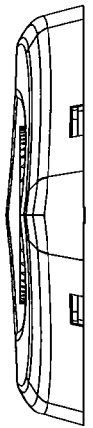
FIG. 19 is a rear elevation view of the LED marine docking lamp shown in FIGS. 16-18.
Figure 16:
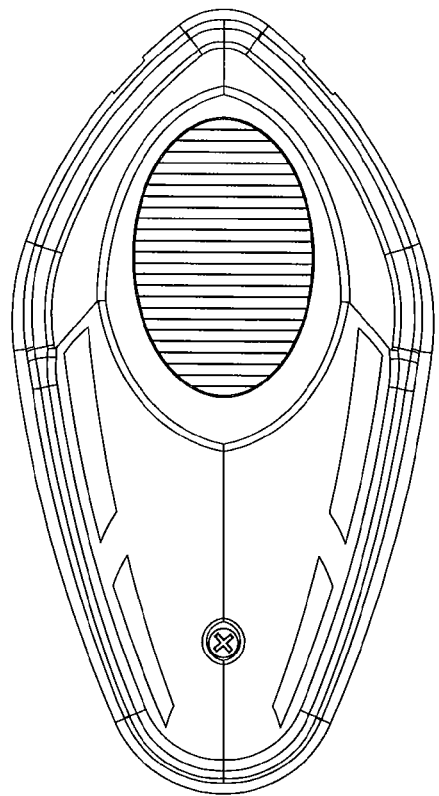
FIG. 16 is a top view of yet another marine docking lamp in accordance with another embodiment of the present invention.
Figure 18:
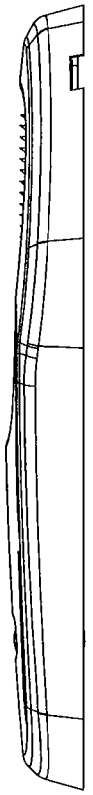
FIG. 18 is a side elevation view of the LED marine docking lamp shown in FIGS. 16-17.

FIG. 16 through FIG. 19 depicts yet another surface mountable LED based docking lamp according to the present invention. As shown in FIG. 17, heat vents 23 are shown in which a screen is mounted internally to obscure the features of the heat sink while providing good cooling properties. The mounting screw 24 retains the rear side of the cover whereas retaining hooks 25 hold the front of the light cover.

Figure 20:
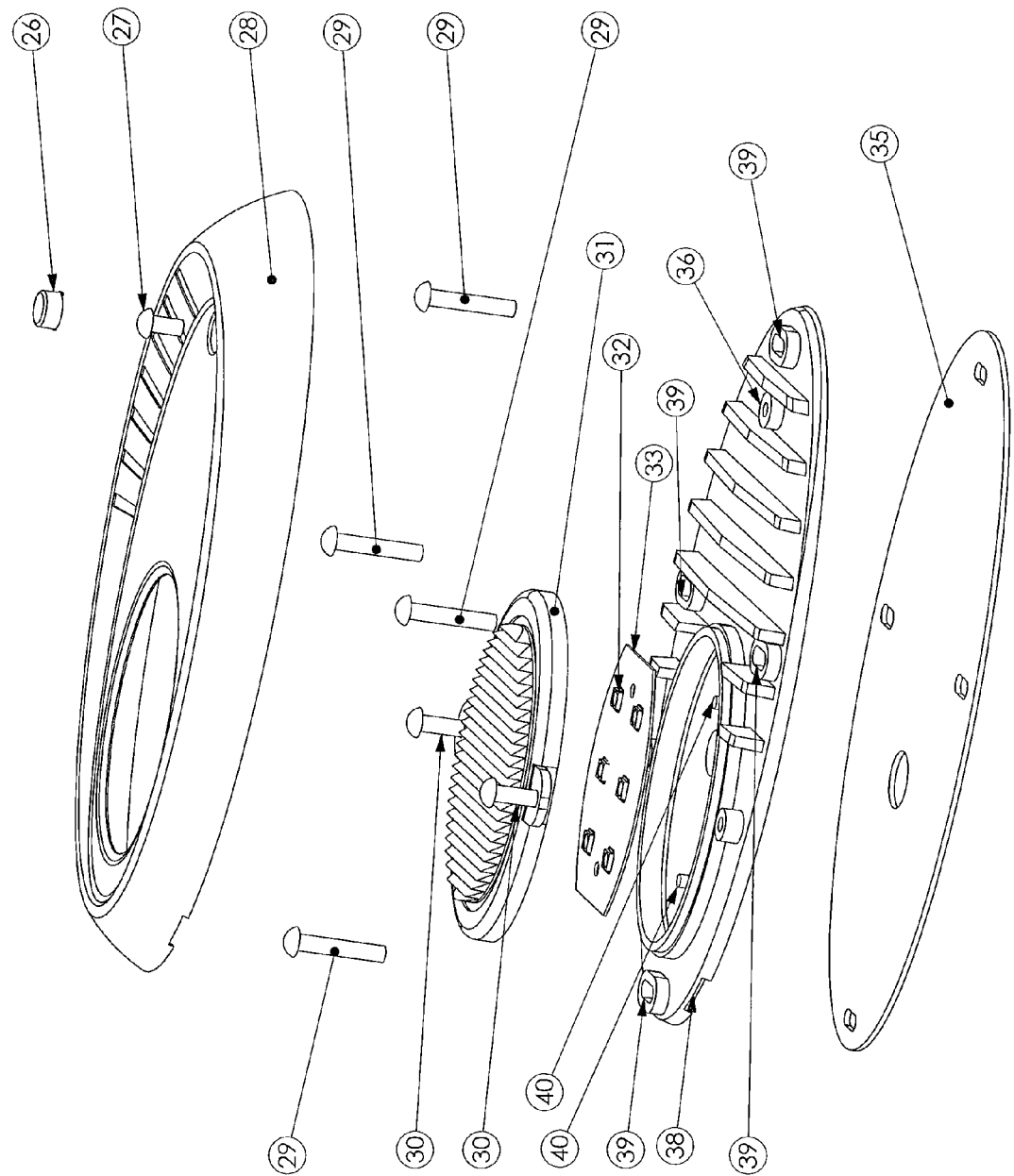
FIG. 20 is an exploded view of the LED marine docking lamp shown in FIG. 7 through FIG. 11.

FIG. 20 is an exploded view of the surface mountable LED based docking lamp of FIG. 7 through FIG. 11. As shown, the docking lamp includes a cover assembly incorporating a screw cap 26 which snaps into cover 28 after assembly retaining screw 27 is screwed in place into screw boss 36. Retaining hooks 37 engage at the aluminum heat sink notches 38 to retain the leading edge of the cover assembly. The aluminum heat sink assembly is attached to the boat hull using retaining screws 29 passing through screw bosses 39 pinching water sealing gasket 35 to the surface of the boat hull. The LED sources 32 are mounted to the PCB 33 and positioned within the aluminum heat sink 34 a variety of adhesives and epoxies may be used to make the attachment permanent and water tight. Two alignment posts 40 engage the PCB and align the LED(s) with the light collection and distribution lens 31. The lens is retained with two screws 30 to the aluminum heat sink.

Figure 21:
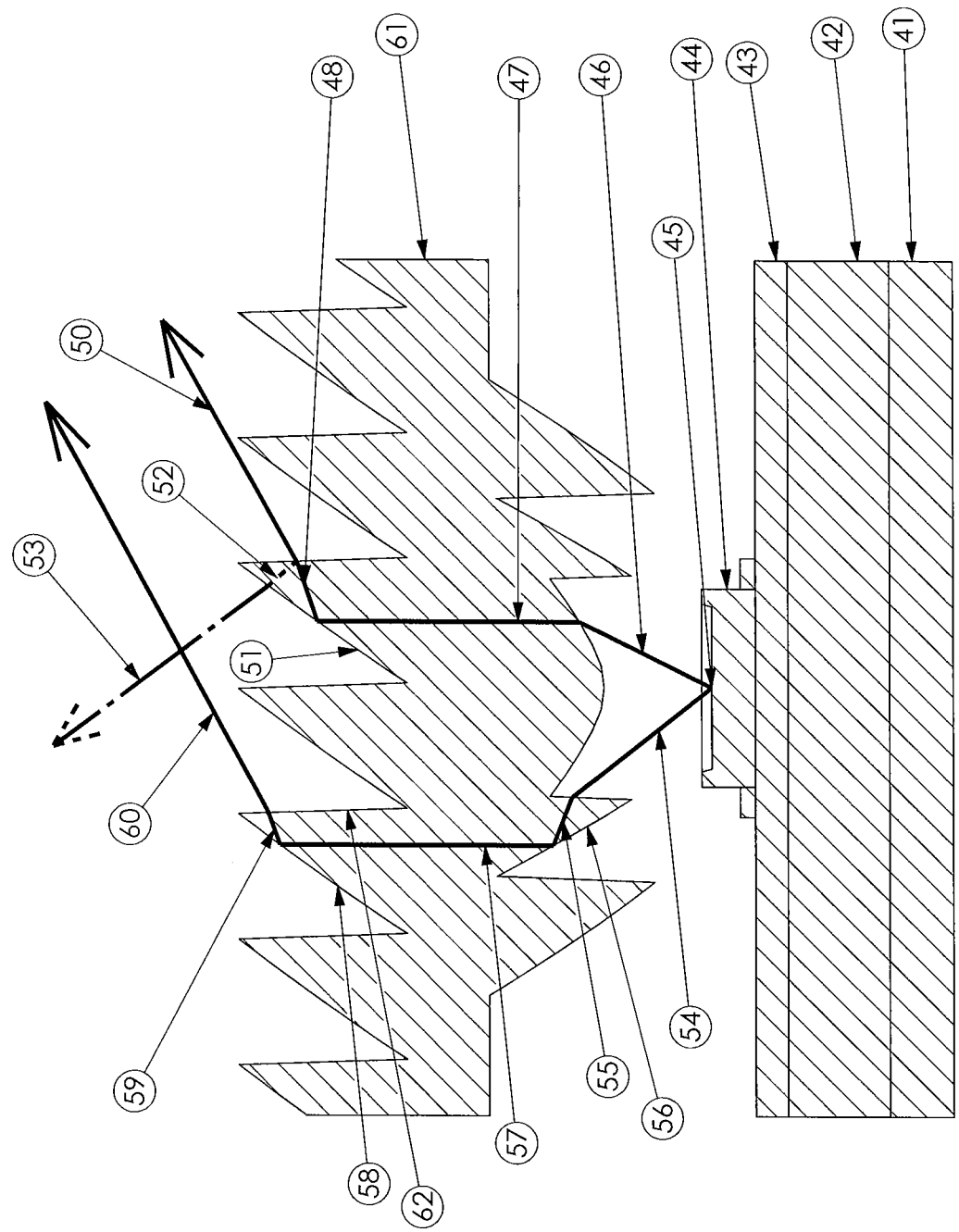
FIG. 21 is a schematic view of a portion of a marine lamp showing light rays passing therethrough in accordance with one aspect of the present invention.

FIG. 21 is a section view of an exemplary lens that may be used with the surface mount LED based docking lamps described herein. Gasket material 41 used to seal the light against the mounting surface is compressed by the aluminum heat sink 42. PCB 43 is mounted in close proximity to the aluminum surface 42 to allow maximum heat transfer from the LED source 44. The lens 61 is positioned above the hemispherical Lambertian emitting LED source 44 to direct the light into the required pattern. Two example light rays are shown to describe the function of the lens. Light emits from point 45 along path 46 toward the lens. Refracting into the lens material the ray path changes along line 47 where it is directed to strike outer surface 51 whereas it is at an angle greater than the critical angle for the material and is caused to internally reflect along path 48. The light energy then strikes lens outer surface 49 and the majority of the energy refracts out of the material along path 50 into the required beam pattern. A small percentage of the exiting energy form ray 48 experiences reflection and travels back along path 52 striking surface 51 where it is refracted out of the material along path 53. A second higher angle ray 54 enters the lens and refracts along path 55 where it strikes surface 56 and experiences internal reflection. The reflected energy travels along path 57 and strikes surface 58 where it also experiences internal reflection bending the energy along path 59. Ray 59 strikes outer surface 62 and refracts into the required pattern along beam 60. It is important to note that although only one secondary low energy reflection 53 is shown, in practice, each surface where the light strikes the optic may generate some imperfections in the redirection of the beam. The refractive interfaces in particular may generate a secondary reflected beam with a varying percentage of the light energy. These reflections and optical radii combine to form an output beam with a spread angle in the plane of the drawing from beyond ray 53 to beyond ray 50 with noticeable intensity.

Figure 22:
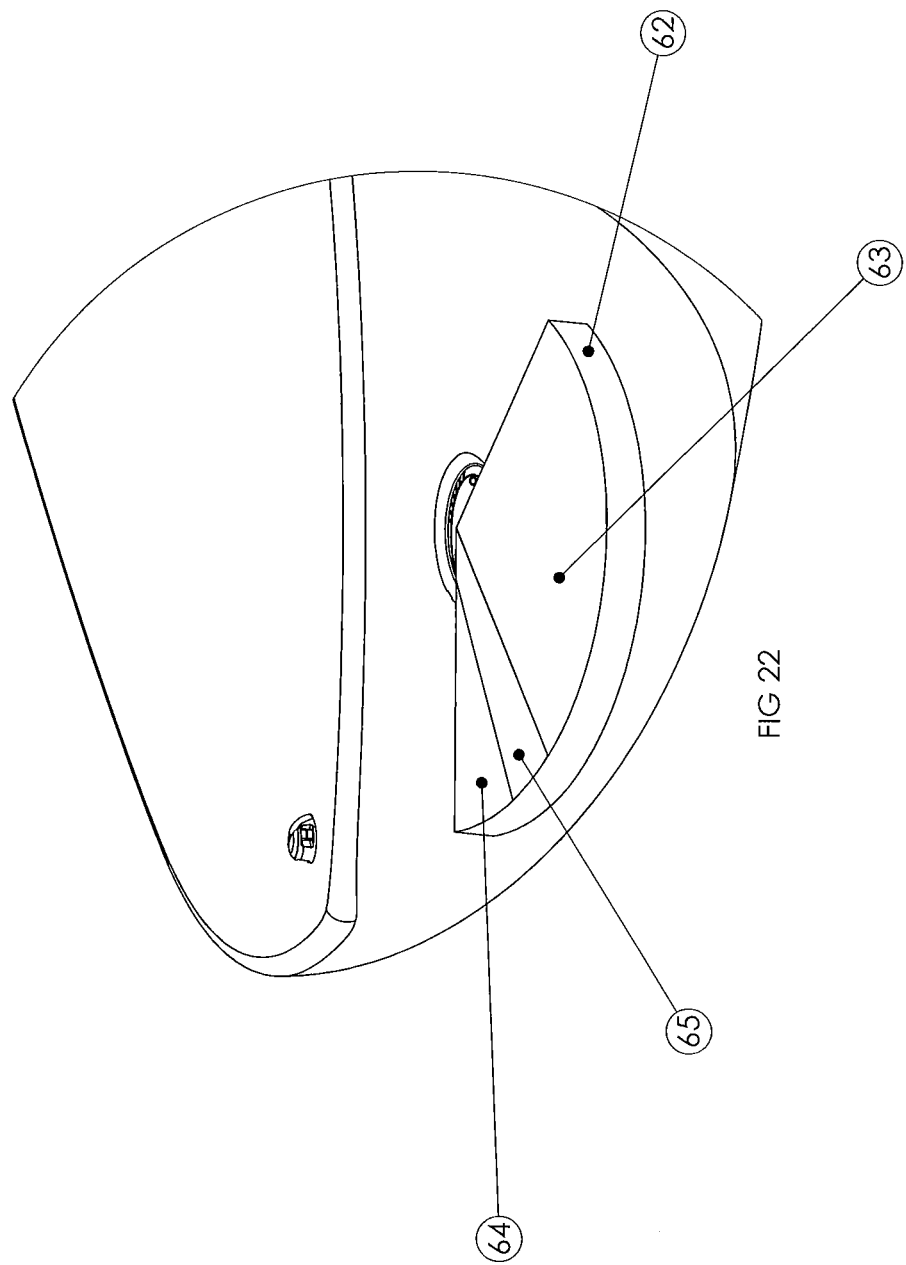
FIG. 22 is an enlarged view of the bow of a marine vessel with a docking lamp made in accordance with the present invention with an output light distribution superimposed over the lamp.

FIG. 22 is a close up view of a marine vessel with a surface mount LED docking light incorporating the lens of FIG. 21. An additional overlay of the output beam pattern is shown 62. In the illustrated example, the output beam consists of 3 primary sections. Sections 63 and 64 are comprised of scattered energy from secondary reflections and optical radii. Section 65 is a high intensity beam directed ahead of the marine vessel when mounted correctly. The combination of the light energy projects the highly desirable light pattern for a marine docking lamp. It will thus be appreciated that in accordance with one embodiment of the invention, the lens internally reflects light from the LED to provide a ring-shaped output, wherein the ring-shaped output includes a primary light beam in which light is emitted at an angle approximately 60 degrees to the surface normal and a secondary light beam in which light is emitted over an arc of 180 degrees measured in the plane of the surface normal, as generally shown in FIG. 22.

It will be appreciated that the present invention provides a novel method for creation of a surface mounted lamp for the distribution of electromagnetic radiation (light) at a high angle of incidence from the mounting surface. Wide output light distributions can be generated from nearly any source including but not limited to incandescent lamps, LEDs, arc and gas discharge lamps.

In order to create a device in accordance with the present invention, it is preferred to first determine the parameters of the device, including the requirement and intensity to be projected and the light source to be used. Once these parameters are ascertained, an appropriate optic can be shaped by a wide variety of computerized software lens optimization algorithms or spreadsheet based techniques.

The manufacturing of a lens in accordance with the present invention may be accomplished through a variety of processes including but not limited to injection molding, directly cutting the optic into transparent material and polishing the surface and other known and to-be-developed techniques. One preferred method for commercial production of such a device is injection molding because of the complex shapes of the lens. Further, the lens can be made of any material transparent to electromagnetic energy or light including but not limited to polycarbonate, acrylic, polystyrene, and glass.

A wide variety of computational algorithms in spreadsheets or software can be used to compute an appropriate surface shape for the lens. In using such algorithms, particular attention should be paid to the percent transmission of the light at higher angles of incidence to the surface normal and the output waveform distortion at high angles of incidence. The algorithms must also be constrained in an appropriate manner such that manufacturable surfaces are computed.

The angle of refraction of light through a surface is governed by Snells law. Snell's law gives the relationship between angles of incidence and refraction for a wave impinging on an interface between two media with different indices of refraction. Like any continuous mathematical function Snells law can be approximated by a linear function when considered over a sufficiently small angle.

LEDs as with all commercial electrical light sources generate heat. Although the LED efficiency is higher than many sources the heat generated must still be removed. Excess heat degrades the performance of the LED and shortens its lifespan. LED lamps must therefore be designed with proper heat sinking to maintain product performance and life. Accordingly, various heat sinking devices may be used, including printed circuit board PCB vias soldered full, heavy copper PCBs, epoxies, urethanes, thermally conductive potting materials, plastics, thermally conductive plastics, metal heat sinks and the like.

References to electromagnetic radiation or light in this application are intended as references to the entire electromagnetic spectrum, including the visible spectrum and all non-visible wavelengths including but not limited to infrared, ultraviolet, x-ray, gamma ray and microwave.

The present invention may also be implemented by angling the LEDs in the direction of the main beam with minimal thickness penalty. Collection optics would also be angled for the concentration of the energy form each LED along the primary beam path. This allows the projection of a single high intensity beam from the lamp but may poses some issues associated with projecting light to the side of the device.

The present invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter disclosed herein.

What is claimed is:

1. A surface mounted lamp comprising:
   a base that mounts to a mounting surface;
   a light source supported by the base, wherein the light source has an optical axis and that emits light about an output distribution greater than 45° to the optical axis;
   a lens that collects light energy from the light source and narrows the collected light energy into a beam having an optical axis greater than 45° to the mounting surface normal, wherein the beam has an intensity that is greater than the intensity of the light energy at any point along the output distribution, of the light source;
   the beam being defined by a high energy portion associated with light energy that is refracted into a plurality of generally parallel discrete rays as the light energy exits an outer surface of the lens such that a majority of the light energy associated with the high energy portion of the beam is directed along the optical axis at greater than 45° to the mounting surface normal and a lower energy portion oriented toward a horizontal side of the high energy portion associated with light energy that is reflected by the outer surface of the lens;
   a heat sink; and
   a cover.

2. The lamp of claim wherein the heat sink and the cover are coupled to one another to form a single unit.

3. The lamp of claim 1 wherein the light source is one of a light emitting diode (LED), an incandescent lamp, and a gas discharge lamp.

4. The lamp of claim 1 wherein the outer surface of the lens is further defined as a first outer refractive surface that refracts a majority of light incident thereon out of the lens along a first refractive path associated with the high energy portion of the beam and reflects a minority of the light incident thereon toward a second outer refractive surface that refracts the reflected light out of the lens along a second refractive path that is angularly offset from the first refractive path associated with the lower energy portion.

5. The lamp of claim 1 wherein the cover is adapted to couple to the base to secure the one or more light sources, heat sink, and lens in an internal volume defined by the base and the decorative cover, and wherein a combined thickness of the lamp is less than three inches.

6. The lamp of claim 5 wherein the combined thickness is less than two inches.

7. The lamp of claim 1 wherein the light source provides a luminosity of greater than 250 lumens.

8. The lamp of claim 1 wherein the lens provides a ring-shaped output, the ring-shaped output including a primary light beam defined by the high energy portion of the beam in which light is emitted along the first refractive path at an angle approximately 60 degrees to the mounting surface normal and a secondary light beam defined by the lower energy portion of the beam in which light is emitted along the second refractive path over an arc of 180 degrees measured in the plane of the mounting surface normal.

9. The lamp of claim 1 wherein the light source includes a plurality of light emitting elements.

10. A surface mounted lamp device for the creation of a light distribution having a high intensity beam directed at an angle of greater than 45 degrees to a mounting surface normal, the lamp comprising:
    a light source having a hemispherical emitting LED;
    a lens associated with the light source and wherein the lens internally reflects light from the LED to provide a ring-shaped output, the ring-shaped output including a primary light beam associated with a plurality of light rays that originate from the light source such that a majority of the output energy is emitted at an angle greater than 45 degrees from the surface normal and in which light is emitted at an angle approximately 60 degrees to the surface normal and a secondary light beam that is formed by a low energy portion of the plurality of light rays that is reflected by the lens during formation of the primary light beam and in which light is emitted over an arc of 180 degrees measured in the plane of the surface normal.

11. The lamp of claim 10 further comprising a heat sink associated with the LED.

12. The lamp of claim 11 further comprising a cover assembly including a base plate and a cover, the base plate adapted to receive the heat sink, LED, and lens, and the cover adapted to couple to the base plate.

13. The lamp of claim 12 wherein the cover assembly, heat sink, LED, and lens, when assembled, has a thickness less than 3 inches.

14. The lamp of claim 13 wherein the cover assembly, heat sink, LED, and lens, when assembled, has a thickness of approximately 2 inches.

15. The lamp of claim 11 wherein the base plate includes a series of alignment openings that allow some adjustability in positioning of the base plate relative to an exterior surface of a boat hull.

16. The lamp of claim 15 further comprising a water-sealing gasket that is fit between the base plate and the exterior surface of the boat hull.

17. The lamp of claim 12 wherein the base plate is adapted to receive interchangeable covers.

18. The lamp of claim 12 wherein the cover includes a vent arrangement.

19. A surface mounted lamp device for the creation of a light distribution having a high intensity beam directed at an angle of greater than 45 degrees to a mounting surface normal, the lamp comprising:
    an LED light source;
    a heat sink associated with the LED light source and configured to remove heat from the LED light source; and
    a lens that directs light emitted by the LED light source, wherein the lens provides a primary light beam defined by a plurality of generally parallel emitted rays associated with a majority of the light energy and at an angle approximately 60 degrees from a mounting surface normal and a secondary light beam that is comprised of energy associated with the respective generally parallel emitted rays that is reflected by the lens upon exit of the primary light beam from the lens and having an intensity less than the primary light beam at an angle wider than 60 degrees from the mounting surface normal.

20. The surface mounted lamp of claim 19 further comprising a cover providing an enclosure for the LED light source, the heat sink, and the lens assembly, and wherein the cover includes an opening operative as a vent to provide air flow to the heat sink.

* * * * *